United States Patent [19]

Wrobel

[11] Patent Number: 4,703,209
[45] Date of Patent: Oct. 27, 1987

[54] ELECTRIC MOTOR, ESPECIALLY COLLECTORLESS D.C. MOTOR, WITH AN OUTSIDE ROTOR

[75] Inventor: Guenter Wrobel, Villingen, Fed. Rep. of Germany

[73] Assignee: Papst-Motoren GmbH & Co. KG, St. Gerogen, Fed. Rep. of Germany

[21] Appl. No.: 857,474

[22] Filed: Apr. 30, 1986

[30] Foreign Application Priority Data

Apr. 30, 1985 [CH] Switzerland ............... 01814/85

[51] Int. Cl.⁴ .................................................. H02K 7/00
[52] U.S. Cl. .................................. 310/67 R; 310/68 B
[58] Field of Search ................. 310/67 R, 68 R, 68 B

[56] References Cited

U.S. PATENT DOCUMENTS

| | | | |
|---|---|---|---|
| 3,596,122 | 7/1971 | Stewart | 310/67 |
| 3,919,572 | 11/1975 | Desy | 310/67 X |
| 4,110,647 | 8/1978 | Eslinger | 310/67 R X |
| 4,259,603 | 3/1981 | Uchiyama | 310/67 X |
| 4,540,906 | 9/1985 | Blom | 310/67 R |
| 4,629,919 | 12/1986 | Merkle | 310/67 X |
| 4,647,803 | 3/1987 | von der Heide et al. | 310/676 |

*Primary Examiner*—Donovan F. Duggan

[57] ABSTRACT

The stators of collectorless d.c. motors are securely connected with the bearing support member, and/or with the fastening flange. The printed circuit board with the electronic components for the commutation is arranged for space reasons in collectorless d.c. motors between the fastening flange and the stator. This type of construction makes impossible an exchange of, for example, defective components. According to this invention, a removable stator is proposed which is retained and secured by means of only a spring element.

26 Claims, 6 Drawing Figures

ELECTRIC MOTOR, ESPECIALLY COLLECTORLESS D.C. MOTOR, WITH AN OUTSIDE ROTOR

The present invention relates to an electric motor with an outside rotor, especially to a collectorless d.c. motor, which includes a stator and a printed circuit board that is retained by way of fastening means at an end face of the stator, and a bearing support member connected with a fastening flange.

Such motors are knwon in the prior art. They serve different drive purposes such as, for example, as coaxial drive of fans. The stators of these motors are securely connected with a bearing support member, respectively, tubular bearing member, for example, by means of adhesion or bonding. For cost reasons, the tubular bearing member is connected in one piece with a fastening flange that covers off the outer diameter of the outside rotor. In case of fans, the tubular bearing member, the fastening flange and additionally also the outer housing which delimits the outer flow channel, are made in one piece. For space reasons, the printed circuit board is located between the fastening flange and the stator, as a result of which an exchange of components, respectively, the repair of defective places on the printed circuit board is no longer possible. Especially applications in which a printed circuit board with complex electronics is necessary, high costs result therefrom that is, instead of interchanging, for example, only one component, the entire motor has to be exchanged.

It is the object of the present invention to so construct the stator together with the printed circuit board secured thereon that it is interchangable in a simple manner and as a result thereof, the printed circuit board is accessible.

The underlying problems are solved according to the present invention in that the stator is mounted with a sliding seat on the outer surface of the bearing support member and is secured by means of a spring element axially and against rotation.

With only a single coil spring which, on the one hand, engages in a ring-shaped groove of the tubular bearing member and, on the other, presses the lamellae package of the stator against an axial abutment of the tubular bearing member, it is achieved in a simple manner that the stator can be removed and the printed circuit board can be repaired. This spring is a simple part which, in particular in large quantities, is an inexpensive purchase item that can be made by an automatic spring-manufacturing machine.

An axially bent or offset end of the coil spring, which projects into an aperture of the stator, secures the stator against rotation on the tubular bearing member.

The axial limitation of the coil spring, whose one end winding acts as spring- or snap-ring is achieved by a groove machined into the end of the tubular bearing member. The inner diameter of this end winding of the spring is equal to or smaller than the diameter of the groove. Since it is necessary anyhow to machine the tubular bearing member, for example, on the inside the ball bearing seat and on the outside the stator lamellae seat, the cutting-in of the groove and the orthogonal abutment surface at the flange side of the tubular bearing member can be realized at the same time.

A groove arranged in the outer surface of the tubular bearing member and extending in the axial direction can be made already during the manufacture of the one-piece tubular bearing member-flange-housing-part.

These and other objects, features and advantages of the present invention will become more apparent from the following description when taken in connection with the accompanying drawing which shows, for purposes of illustration only, two embodiments in accordance with the present invention, and wherein.

Figure 1:
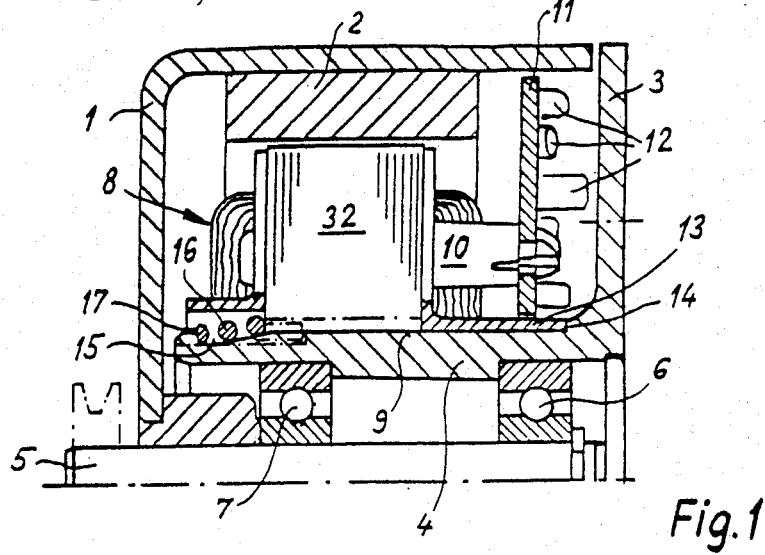
FIG. 1 is one-half of an axial cross-sectional view of an electric motor in accordance with the present invention.

Referring now to the drawing wherein like refernece numerals are used throughout the various views to designate like parts, and more particularly to FIG. 1, this figure illustrates an electric motor with a pot-shaped outside rotor 1, at the cylindrical inner wall of which a permanent magnet 2 is secured. A flange 3 is formed in one piece with the tubular bearing member, for example, as plastic injection-molded part. However, also light-metal alloys, zinc and other materials are suitable for the manufacture of such a part (3+4).

A shaft 5 is supported in bearings 6 and 7, for example, ball bearings, and is non-rotatably connected with the outside rotor 1 so as to rotate in unison therewith. A stator generally designated by reference numeral 8 is mounted with a sliding seat on the outer surface 9 of the tubular bearing member 4. The stator contains stay bolts 10 on the end disk side, on which is arranged a ring-shaped printed circuit board 11 in the form of a plate with components 12, that includes the commutator electronics and the rotor position sensors. For space reasons, the printed circuit board 11 is on the side of the stator 8 which points toward the flange 3. By means of its end disk 13 on the side of the flange 3, the stator 8 abuts in the axial direction at an orthogonal abutment surface 14. This abutment surface 14 results during the finish-machining of the outer surface 9 of the tubular bearing member 4. At the other axial end of the tubular bearing member 4 a groove 15 is cut into the outer surface 9 in one setting, whose width and depth corresponds to the diameter (respectively, cross section) of the wire of a spring element 16. This spring element 16 is constructed as coil spring which includes at one axial end an abutment winding 17 that serves at the same time as snap-ring for the tolerance-compensating axial fixing of the stator 8. At the other end of the coil spring 16, the end 18 of the spring wire is bent off in the axial direction.

Figure 2:
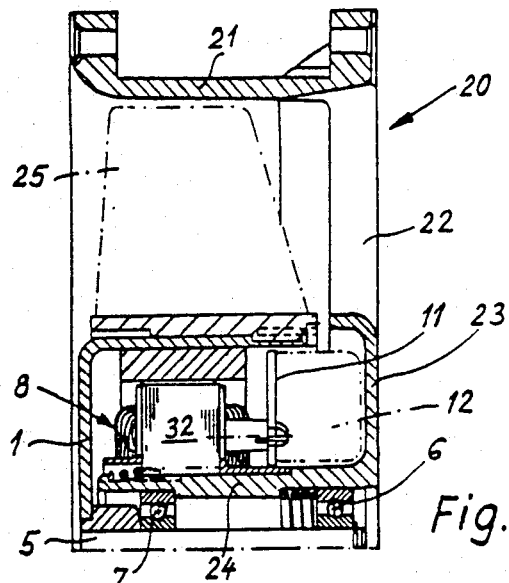
FIG. 2 is one-half of an axial cross-sectional view of a second embodiment of an electric motor in accordance with the present invention.

An axial fan generally designated by reference numeral 20 with a housing 21 is illustrated in FIG. 2. This housing 21 is made in one piece with connecting webs 22, with a flange 23 and with a tubular bearing member 24, for example, as plastic injection-molded part or as die cast metal part. The coaxial driving motor of the fan 20 corresponds to the one described in FIG. 1. Only an impeller 25 is secured on its outside rotor 1.

Figure 3:
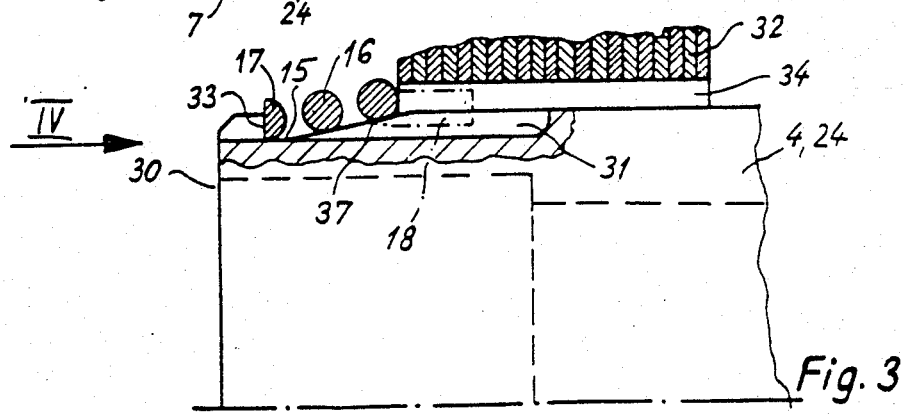
FIG. 3 is a detail, partly in cross section and on an enlarged scale, in the electric motor according to the present invention.

FIG. 3 illustrates on an enlarged scale a detail at one end 30 of the tubular bearing member 4, 24. An axially extending groove 31 is arranged in the outer surface 9 of the tubular bearing emmber 4, 24, which commences at the end 30 of the tubular bearing member and extends so far into the area of the stator lamellae package 32 that the bent-off end 18 of the spring 16 is not limited axially. This groove 31 can be realized without significant cost during the manufacture of the part. The width of the groove 31 is matched to the cross section of the wire of the spring 16.

Figure 4:
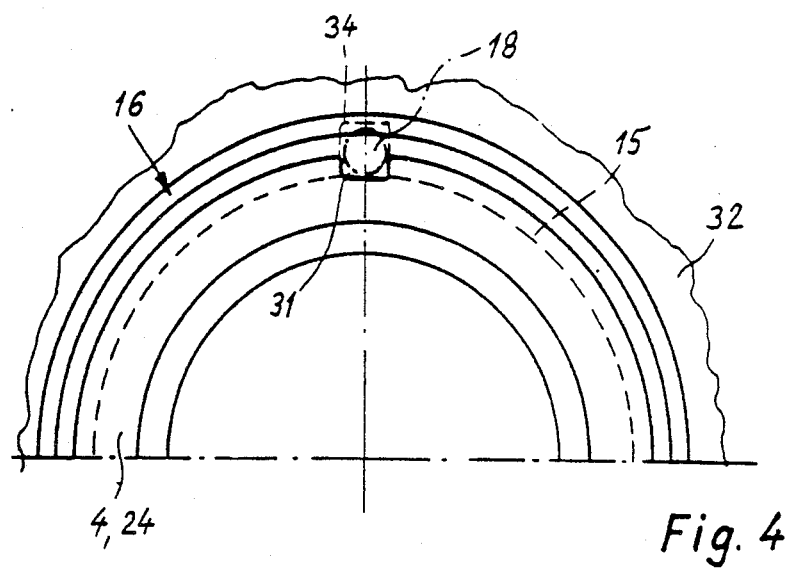
FIG. 4 is an elevational view of the detail of Figure 3, taken in the direction of arrow IV in FIG. 3.

The view shown in FIG. 4 serves solely for a better understanding of the invention. The function of the bent-off end 18 as anti-rotation protection in the groove 31 within the tubular bearing member 4, 24, on the one hand, and the aperture 34 in the stator lamelllae package, on the other, can be recognized in this figure of the drawing.

Figures 5, 6:
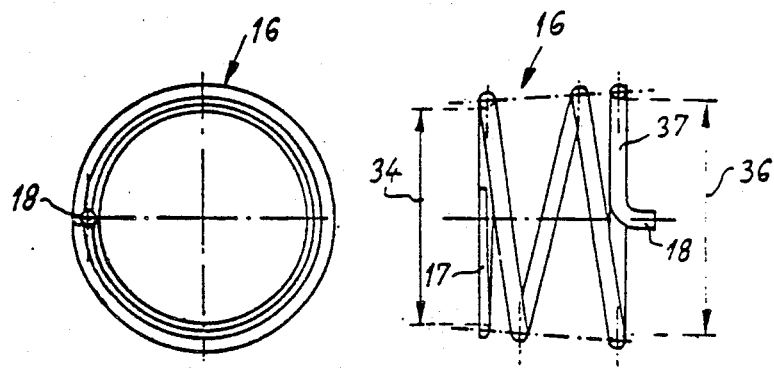
FIG. 5 is a plan view on the spring element in accordance with the present invention.
FIG. 6 is a side elevational view of the spring element in accordance with the present invention.

The spring 16 is illustrated as individual part on an enlarged scale in FIGS. 5 and 6. The spring 16 is wound helically shaped and slightly conically, preferably of spring steel wire with circular cross section. The one end winding is placed into abutment essentially at right angle to the axis and is so ground that a flat surface results which abuts at a surface 33 of the groove 15 which is also arranged at right angle to the axis. The inner diameter, illustrated as double arrow 34, of the end winding 17 is so dimensioned that it acts like a snap-ring. As a result thereof, not only the snap-ring, respectively, safety ring for the axial securing of the stator lamellae package 32 can be economized, but also additionally an axial tolerance compensation is achieved. The other end winding is also placed into abutment at right angle and contains additionally the already described bent-off end 18 which, on the one hand, projects into an aperture 34 of the stator lamellae package 32 and, on the other, into the groove 31 and therewith forms the radial anti-rotation securing of the stator 8 with respect to the tubular bearing member 4, 24. The inner diameter of the other end winding 37 of the spring 16, indicated by a double arrow 36, is appropriately larger than the end winding 17 because this winding 37 is only to abut against the stator lamellae package 32 with axial pressure.

The coil spring 16 in accordance with the present invention fulfills three functions: (1) the clamping, (2) the axial securing and (3) the prevention of circumferential movement.

The assembly of the stator 8 on the tubular bearing member 4, 24 takes place by way of a cone mounted on the tubular bearing member as inner guide assist and an axially pressing hollow stamp until the end winding 17 of the spring 16 has engaged in the groove 15, that is, abuts, on the one hand, at the surface 33 and, on the other, at the stator lamellae package 32, whereby the bent-off end 18 is guided along the groove 31 into the aperture 34. Still more important for the disassembly of the stator is the fastening according to the present invention of the stator. One requires only a pin-shaped object, for example, a scribing point, by means of which one engages in the axial groove 31 at the end face and lifts the end winding 17 ("snap-in ring winding") out of the groove 15. The stator 8 can now be assembled in a simple manner from the outer surface 9 of the tubular member 4, 24. As a result thereof, the printed circuit board is accessible for repairs. The renewed assembly of the stator takes place in the manner described above which also requires relatively little time.

While I have shown and described only two embodiments in accordance with the present invention, it is understood that the same is not limited thereto but is susceptible of numerous changes and modifications as known to those skilled in the art. For example, in lieu of the coil spring, other types of spring elements may also be used, for example, a flat spring constituting a ring-like (plate-shaped) concentric element or a lengthly sheet-type shaped spring means. I therefore do not wish to be limited to the details shown and described herein, but intend to cover all such changes and modifications as are encompassed by the scope of the appended claims.

I claim:

1. An electric motor comprising outside rotor means, stator means, printed circuit board means, fastening means for fastening the printed circuit board means at an end face of the stator means, and bearing support means operatively connected with a fastening flange, the stator means being mounted with a sliding seat on the outer surface of the bearing support means, and a spring means for securing the stator means axially and against rotation.

2. An electric motor according to claim 1, wherein said electric motor is a collectorless d.c. motor.

3. An electric motor according to claim 1, wherein said outside rotor means has a bell-shaped configuration, and wherein the printed circuit board means is retained at an open side of the bell-shaped outside rotor means.

4. An electric motor according to claim 1, wherein the stator means is secured axially by means of the spring means acting springly in an abutting manner and secured against rotation by the spring means acting in a locking manner.

5. An electric motor according to claim 4, wherein the spring means is a coil spring whose end windings have differing diameters, one end winding being disposed essentially at right angle to the axis of the coil and the other end winding including an end axially extending.

6. An electric motor according to claim 5, wherein said bearing support means is a tubular bearing member, the outer surface of the tubular bearing member being provided at one end with a circumferential groove and at an opposite end thereof having the flange and an abutment surface.

7. An electric motor according to claim 6, wherein the outer surface of the tubular bearing member includes an axially extending groove in the axial end area that is disposed opposite the flange.

8. An electric motor according to claim 7, wherein the stator includes a stator lamellae package and wherein axially extending groove commences at the one end of the tubular bearing and extends coaxially up to the stator lamellae package of the stator means.

9. An electric motor according to claim 8, wherein an inner bore wall of the stator lamellae package includes a coaxial aperture extending in an axial direction and wherein the length and width of the aperture is greater than the length and width of the axially extending end of the spring.

10. An electric motor according to claim 9, wherein the electric motor is a coaxial driving motor for a fan and wherein the fastening flange acts as an outer fan housing flange and wherein the fastening flange is a flange on the tubular bearing member.

11. An electric motor according to claim 10, wherein the one end of the winding has an inner diameter which is equal to or smaller than the groove.

12. An electric motor according to claim 10, wherein the one end of the winding is flat.

13. An electric motor according to claim 1, wherein the spring means a coil spring whose end windings have differing diameters, one end winding being disposed essentially at right angle to the axis of the coil and the other end winding including an axially extending end.

14. An electric motor according to claim 1, wherein said bearing support means is a tubular bearing member the outer surface of the tubular bearing member being provided at one end with a circumferential groove and at an opposite end thereof havng the flange and an abutment surface.

15. An electric motor according to claim 14, wherein said flange is a portion of said tubular member.

16. An electric motor according to claim 14, wherein the outer surface of the tubular bearing member includes an axially extending groove in the axial end area that is disposed opposite the flange.

17. An electric motor according to claim 7, wherein the stator includes a stator lamellae package and wherein axially extending groove commences at the one end of the tubular bearing and extends coaxially up to the stator lamellae package of the stator means.

18. An electric motor according to claim 9, wherein an inner bore wall of the stator lamellae package includes a coaxial aperture extending in an axial direction and wherein the length and width of the aperture is greater than the length and width of the axially extending end of the spring.

19. An electric motor according to claim 9, wherein the electric motor is a coaxial driving motor for a fan and wherein the fastening flange acts as an outer fan housing flange and wherein the fastening flange is a flange on the tubular bearing member.

20. An electric motor according to claim 13, wherein the one end of the winding has an inner diameter which is equal to or smaller than the groove.

21. An electric motor according to claim 20, wherein the one end of the winding is flat.

22. An electric motor according to claim 1, wherein the spring means is operable to produce an axial force between the stator means and the bearing support means.

23. An electric motor according to claim 22, wherein said spring means is constituted by a substantially flat spring having at least one first portion which serves for engagement with one of the stator means and at least one second portion which serves for engagement with the bearing support means.

24. An electric motor according to claim 23, wherein at least one of said engagements is a circumferential snap-in engagement.

25. An electric motor according to claim 23, wherein said flat spring is a lengthy sheet-type spring and said first and second portions each being an end area of said lengthy spring.

26. An electric motor according to claim 1, wherein said flange extends at a substantially right angle to said bearing support means and wherein said bearing support means is of tubular shape.

* * * * *